United States Patent [19]
Darragh et al.

[11] 3,867,556
[45] Feb. 18, 1975

[54] FATS WITH ENCAPSULATED FLAVORS

[75] Inventors: Richard T. Darragh; James L. Stone, both of Cincinnati, Ohio

[73] Assignee: The Procter & Gamble Company, Cincinnati, Ohio

[22] Filed: Dec. 21, 1972

[21] Appl. No.: 317,470

[52] U.S. Cl.................... 426/98, 426/99, 426/199, 426/221, 426/226, 426/362, 426/392, 426/417, 424/34
[51] Int. Cl............................................. A23l 1/26
[58] Field of Search....... 426/98, 99, 175, 221, 303, 426/362, 65, 199, 226, 273, 417; 424/34, 35, 36, 37

[56] References Cited
UNITED STATES PATENTS
3,265,629   9/1966   Jensen ................................ 424/34

*Primary Examiner*—Raymond N. Jones
*Assistant Examiner*—R. A. Yancoskie

[57] ABSTRACT

This invention relates to double encapsulation of volatile flavors in an inner layer of heat-release material and an outer layer of water-soluble material. The particles thus formed are incorporated into shortenings in varying quantities depending on individual taste. Foods, which are baked, fried, griddled, or otherwise prepared in shortenings containing said double-encapsulated flavor particles exhibit improved flavor. This improved flavor is due to the increased retention of shortening flavors which are normally substantially volatilized during processing and food preparation. These flavors are now carried through to the final product as they are protected by the double encapsulation layers.

34 Claims, No Drawings

FATS WITH ENCAPSULATED FLAVORS

BACKGROUND OF THE INVENTION

Many attempts have been made in the past to improve the stability of flavorings and seasonings and to facilitate their use (particularly their incorporation and distribution in solid form food products) by modifying their physical form in one way or another prior to incorporation into a shortening system. For purposes of this application the term shortening is intended to be generic to plastic shortenings, liquid shortenings, oils such as salad oils and edible triglycerides in general. Generally, these modified forms have represented a marked improvement in one or more respects but often, at the same time, disadvantageous characteristics have been introduced or magnified. Thus, during shortening storage there may have been separation or evaporation of the actual flavor material from the shortening diluent or carrier. Emulsions, for example, are inherently unstable and naturally tend to separate on storage. Also, the solid absorbent types of materials which are commonly used as carriers and fillers in preparing solid granular products and liquid flavorings often increase the exposed surface area of the active flavoring ingredient, thus greatly magnifying the problems of atmospheric deterioration and/or loss of strength due to vaporization. Often such solid carriers are hygroscopic in nature and/or tend to cake together and form lumps on standing.

For purposes of this application unless otherwise set forth the term flavor compound is intended to be generic to liquid, solid, water-soluble, water insolubles, or other type flavor ingredients or materials. Many of the well-known natural and synthetic flavors are liquids or solids consisting of complex combinations of several compounds. These flavor compounds are highly volatile and are subject to oxidation in the atmosphere. Because of their volatility these compounds tend to lose their flavor and odor upon standing. In addition, these flavors are very difficult to incorporate homogeneously or uniformly into solids. Because of these difficulties, it has been proposed to prepare aqueous emulsions of the flavor compounds and to package the emulsions as such or to dry the dispersed emulsion into a granular product. Many materials have been proposed as emulsifying or suspending agents for these applications. Exemplary of these agents are water dispersible gums such as gum arabic and gum tragacanth or other polysaccharides, and water-soluble cellulose derivatives, such as carboxy hydroxyethyl cellulose or sodium carboxymethyl cellulose. However, generally water dispersible gums had to be employed in very high concentrations to achieve satisfactory emulsion stability. Some of the cellulose derivatives did not provide the desired emulsions. Of those cellulose derivatives that did, the particle size was so large that the resultant emulsions had very poor physical stability. Because of the inherent disadvantages in these prior art flavor compound emulsions, a continuing search has been made to find improved emulsifying and suspending agents.

The use of volatile flavorings in such applications as shortenings for food use is often greatly hampered by the rapid evaporation and loss of the volatile components. Thus, although one may prepare flavored products, which initially contain the appropriate degree of flavor or fragrance, the ultimate consumer often finds that there has been a considerable reduction in these properties. This loss will, of course, detract from the desirability as well as from the utility of the products concerned.

Many techniques have been proposed to overcome the problems listed supra. These procedures generally involve the preparation of solid compositions containing the volatile ingredient trapped therein. Such compositions may be prepared, for example, by mixing the volatile compound with a suitable absorbent base. In another method, the volatile materials are dispersed with solutions of various protective colloids, in which form they are dried and ground.

Of late, the technique of spray-drying has found wide acceptance as a means of preparing solid particles containing entrapped flavors or volatile substances. In this technique the volatile compounds are first emulsified in an aqueous solution of a water-dispersible protective colloid such as a gelatin, gum arabic, starch, or dextrin. This emulsion is then sprayed into a column of heated air or gases, which evaporates the water. It is believed that the dry particles resulting from that process comprises a shell or capsule of the dry colloid in which the flavor is embedded or encapsulated to form minute droplets. If the flavoring compound is an oil it may also be absorbed in the colloid base.

Other drying means have also been proposed such as spreading the emulsion on belts and passing the belts through drying tunnels, drying on heated drums, and the like. These procedures permit volatile, water-immiscible oils or other substances to be put into a solid, highly water-dispersible form which easily lends itself to blending with a wide variety of other ingredients, while also offering protection against the evaporation of the volatile components from the dry particles.

As may be derived from the above, it is well known to encapsulate liquid or viscous compositions in a suitable solid encapsulating material to provide a stable particulate solid. For example, essential oils, oleoresins, flavoring essences are sometimes microencapsulated in a suitable water-soluble gum, such as gum acacia, to form a dry powdery composition. Such encapsulation may conveniently be achieved by spray drying an emulsion of the active material in an aqueous solution of the encapsulating material.

The primary disadvantage of the prior art teaching is that despite encapsulation in a protective material the flavoring materials can be at least partially volatilized during the preparation, packaging, and storage steps due to accidental exposures to water. This disadvantage has now been realized. See for example, South African Patent 705,298 issued to Bush Boake Allen limited in 1969. The disadvantage stems from the fact that when mixed with other food ingredients, including water or moist ingredients, the capsule shells dissolve and release their contents. When the composite food is then heated, either during the manufacturing process or eventually by the consumer, or both deterioration and loss of flavor occur. For example, it has long been known that when flavoring compositions are heated for prolonged periods, e.g. in a bakery, the more volatile components are driven off and the full balance and roundness of the flavoring is lost.

The volatilization problem has been especially acute with relation to attempts to incorporate butter or margarine flavors into shortenings and then to have the same butter or margarine flavor carry-through to products baked, fried, griddled, or otherwise prepared in said shortenings. Butter or margarine flavors are especially desirable in baked products, but due to the high temperatures necessary during baking flavor enhanced shortenings in the past have not carried through the margarine or butter flavor that is initially present in the shortening incorporated into baking dough or the like.

It is therefore a primary object of this invention to provide a micro-encapsulated flavor particle having an inner layer of heat-release material and an outer layer of water-soluble material.

It is a further object of this invention to provide a process for the double encapsulation of volatile flavoring compounds.

It is a further object of this invention to provide a shortening composition containing the double encapsulated flavoring particles of this invention suspended therein.

These and other objects of this invention will be apparent from the foregoing and following description.

SUMMARY OF THE INVENTION

This invention relates to a process for double encapsulating volatile flavoring substances and the flavor particles resulting from said process. More particularly, volatile flavoring substances are first encapsulated in a layer of heat-release material, preferably fat hardstock, with a melting point in the range of 120°F to 160°F. The single encapsulated particles are then further encapsulated by a water-soluble material, preferably a gum material, such as gum arabic. The only limitation on size of the flavor particle is that it must be capable of being suspended in the food product. A particle size range that has been found convenient, but by no means critical is from about 1 micron to about 300 microns. This invention also relates to the shortening composition formed by the incorporation of the flavor particles of this invention into a shortening to produce a superior shortening especially relative to flavor carry-through.

DETAILED DESCRIPTION OF THE INVENTION

This invention relates to the encapsulation of flavors in a heat-release, water insoluble material which in turn is encapsulated in an oil-insoluble, water-soluble material. The advantage of the former is that the flavor is retained even under sustained exposure to mild heat or water until the application of heat which is in the range of 120°F to 160°F.; upon being released, it flavors the carrier (e.g. margarine oil) and anything that is cooked with it. When not specifically set forth for purposes of this application the term cooked is intended to be generic to baking, frying, griddling, or other methods of food preparation. This flavor carry through characteristic is an advantage over other fats in which the flavors are not double encapsulated and therefore are constantly being released and thus significantly diminished in strength. Further, in the case of baking, if an encapsulated butter flavor is placed in margarine, or margarine oil, and this in turn is used in making baked goods, the flavor will not be released until they are baked in an oven.

If flavors are encapsulated in heat-release, water-insoluble material only and exposed to sufficient heat to melt the heat release coating prior to when the flavor is desired, the flavor particles will melt and mix with the coating and the carrier, (e.g. margarine oil) thereby diluting the flavor carry-through to ultimate food products and effecting the flavor of the carrier itself. It has been determined that the second encapsulation in an oil insoluble water soluble material inhibits this premature flavor release. Therefore, the double encapsulation of this invention will permit the addition of flavors to shortenings, e.g. margarine oils, and the flavors are totally retained during shipment, storage, and margarine manufacture without significantly affecting the flavor of the margarine, and released only during the actual cooking of the foods made with the shortening composition containing the particles.

This desirable characteristic of double encapsulated flavors is especially noticeable during shipment of oils containing the double encapsulated flavors via tank trucks or tank cars of the rail system. Normally the tank cars carrying the oil are heated so that the oil does not harden during shipment. If the oils do harden then removal from tanks is, at best, difficult and under most conditions virtually impossible without remelting the oil. The net result under normal circumstances is that flavors are significantly diluted by the heating process during shipment. Using the process of this invention, however, the oil may be heated with no resulting loss of flavor as the flavors are protected by the outer layer of water-soluble material.

The heat release, water insoluble inner encapsulation material is a fat hardstock. This hardstock encapsulating layer can be any natural or synthetic edible monoglyceride, diglyceride, or triglyceride material with a melting point in the range of from about 120°F to about 160°F. Thus, most of the vegetable oils and most animal fats when thoroughly hydrogenated, i.e. to an Iodine Value of 8 or less will be suitable under any condition because the melting point of such products is about 120°F or higher. Among such materials are hydrogenated oils of the following substances: cottonseed, olives, corn, peanuts, soy beans, and hydrogenated animal fats of hogs, cattle and sheep; e.g. lard, oleo oil, oleo stock, oleo stearin, tallow and the like. Some natural fats are sufficiently hard to require neither hydrogenation nor fractionation, e.g. some of the vegetable butters such as chinese vegetable tallow. However, in general, the melting point of the hardstock which is used as the initial encapsulating layer in accordance with the teaching of this invention should never be below about 120°F and depending upon the amount of flavoring dissolved therein and the extent which this will lower the melting point of the finished flavor particles, a minimum melting point of 120°F may be required. The most preferred melting point range is however about 130°F to about 150°F.

For the second encapsulation layer any water-soluble, oil-insoluble material can be used. Materials which have been shown to be effective in this capacity are gum arabic, CMC, dextrins, and other related water-soluble materials. Gum arabic is the preferred water-soluble, oil-insoluble encapsulating agent.

The flavor active material may, for example, comprise a solid such as an essential oil, oleo resin or other flavor essence, or mixtures thereof, with or without other substances. Preferred flavoring materials are butter oil, sweet butter oil, lemon or meat-like flavors. These flavors may be obtained commercially or may be produced according to the taste desired for any particular product.

The double encapsulation technique of this invention is designed to provide the advantageous qualities of both encapsulation layers. Specifically, the heat-release, water-insoluble material, preferably hardstock, is designed to insure that the flavors will be retained in the shortening until the most desirable point of release. This means that during shipment, storage, and manufacture of products from oils containing the double encapsulated flavor particles of this invention, the flavoring oils will remain inert and relatively stable in the shortening carrier without affecting the carrier flavor as opposed to previous flavored shortening products in which the oil and other flavoring materials substantially volatilize prior to usage or are diluted by the carrier. In addition, when shortenings containing the double encapsulated flavor particles of this invention are used for any type of cooking the flavor release will be gradual as the heat release material gradually melts. This is advantageous in that instead of mere localized concentrations of flavor being formed an overall and more desirable total flavor system will be imparted to foods baked, fried, griddled, or otherwise prepared in the shortening of this invention.

Likewise, the water-soluble, oil-insoluble encapsulating layer will insure that the flavoring essences are not released nor the heat-release material affected by the surrounding matrix of oil or other shortenings during storage, manufacture of shipping. Therefore, it can be seen that despite changes which may occur in the temperature during shortening manufacture, shipment, or storage the flavors will be preserved at substantially their initial concentrations until the most desirable point of release, i.e. during the actual baking, frying, griddling or other preparation of foods.

A preferred method for producing the flavor particles described herein is by spray cooling, i.e. by prilling, a dispersion of flavor active material in melted shortening. In this prilling process the melted dispersion of flavoring material and melted shortening is forced through a nozzle whereby it is atomized and formed into microscopic drops, and these drops are allowed to solidify while being cooled, for example, by a cooling gas such as cold air. An especially preferred method of cooling is spraying the atomized droplets into a fiber drum containing dry ice. This spraying into a cold temperature zone causes the atomized, blended composition to coagulate and form discrete microscopic, encapsulated flavor particles. These single encapsulated particles are then collected.

The second encapsulation layer may be applied by means of a fluidized bed. A hollow cylinder is mounted vertically, with a porous plate at the lower end. The single encapsulated particles are placed on the porous plate, and air is forced upward through the plate so that the single encapsulated particles undergo a continuous circular, tumbling type action. The air being forced up through the porous plate can be room temperature or can be heated up to just below 120°F. Specifically, the hotter the forced air the faster the drying effect on the single encapsulated particles. It is, however, critical that the heated air not be hot enough to melt the hardstock coating already present in the single encapsulated particle. The moving particles are then sprayed with a solution of water soluble, oil-insoluble material such as gum arabic. The particles are sprayed continuously over a period of time and gradually form a second encapsulation layer of water-soluble, oil-insoluble material.

These final spraying and thickening steps result in a flavor particle which has an inner coating of heat-release, water-insoluble material and an outer coating of water-soluble, oil-insoluble material. The finished particles are then collected and added to various shortening products in concentrations varied to suit desired product tastes.

It has been found most desirable to form microscopic, double encapsulated particles in the range of from about 1 micron to about 300 microns. This particular range of particle sizes has been found convenient for incorporation into most food products although larger particles are equally viable. It is convenient in that particles of this size remain suspended in various shortenings and oils and thus preventing settling during shipment or storage. The optimum particle size depends on the food being flavored and the particular flavoring material being used. An additional advantage in the use of particles in the size range disclosed herein is that they give a uniform appearance to whatever shortening or oil product they are added to. This is in direct contrast to large flakes, chips and the like which give a spotty and less desirable appearance to products to which they are added.

Another important variable is that of hardstock melting point range. This has been discussed previously, but briefly stated it is important that the melting point range be between about 120°F and about 160°F. The preferred range is from about 130°F to about 150°F.

The relative portion of active flavor ingredient and encapsulating material may be varied widely. In general, it is preferred to use the highest possible proportion of active flavor ingredient consistent with achieving satisfactory encapsulation for the product desired. In some instances, however, it is desirable to dilute the active flavor ingredient. The dilution may be conveniently achieved by increasing the proportion of either or both encapsulating materials or by admixing the active ingredient with an additional diluent.

EXAMPLE 1

Deodorized palm oil hardstock having a melting point of 140°F was melted. A liquid sweet butter oil flavor was added under conditions of agitation. This mixture was placed in a small paint-sprayer and sprayed into a large fiber drum containing dry ice. The lower temperature in the fiber drum cooled the spray so that fine particles could be conveniently collected on a piece of paper.

Three hundred grams of the single encapsulated flavor particles (15% sweet butter oil, 85% hardstock) were placed in a fluidized bed which consisted of a vertically oriented hollow cylinder with a porous plate at the lower end. The single encapsulated particles were placed on the porous plate and subjected to continuous tumbling action caused by air being forced through the porous plate. During the tumbling action, these single encapsulated particles were sprayed, by means of a chromoto-sprayer, with a solution of water and gum arabic (90% water, 10% gum arabic). Over a period of time a second encapsulation layer built up around each of the flavor particles.

The double encapsulated flavor particles were collected and/or added to various shortening products. When added to the shortenings agitation is necessary so as to insure a uniform dispersion of the flavor particles. The encapsulated flavor particles were added to a level of from about 0.20% to about 0.28% based on the shortening weight. The particle size was found to vary between about 53 to about 149 microns. Samples were then prepared in order to compare a shortening containing the flavor enhancer and a non-enhanced shortening. Products such as scrambled eggs, hamburgers, and other griddled products are prepared with both shortening samples. The samples are then compared on the basis of appearance, greasiness, flavor, off flavor, aftertaste, and butter flavor. Results indicated that the encapsulated flavor shortening was preferred.

EXAMPLE 2

Two shortenings are prepared. The first shortening being a traditional, commercially available shortening to which 0.20% to 0.27% of a commercially available butter flavoring material is added. The second shortening is the same as the first with the single exception that the second shortening contains an identical amount of flavoring material except that the flavoring material is double encapsulated. The double encapsulated flavor of the second sample is prepared exactly according to the process as disclosed in Example 1. Two identical commercially available prepared cake mixes are obtained. Each is prepared identically with the single exception that the shortening used in the second cake mix contains the double encapsulated flavor particles mentioned supra, while the other mix does not contain any encapsulated flavors. Comparison of the two finished cakes by an expert taste panel reveals that the cake prepared with the shortening which has been enriched with the flavor particles is prepared due primarily to the excellent taste of the cake product.

EXAMPLE 3

Two batches of cookie dough are prepared according to the following formula and instructions and labeled respectively Sample A and Sample B:

| Equipment | Hobart mixer |
| | 3-quart bowl |
| | paddle |

Sample A

| 24 oz | traditional margarine with normal margarine flavor additives | Blended for 3 minutes at No. 2 speed, and then add |
| 24 oz | granulated sugar | |
| ½ oz | vanilla extract | |
| ¾ oz | salt | |
| 16 oz | whole eggs | blend for 2 minutes at No. 1 speed, then add |
| 36 oz | cake flour | blend for 2 minutes at No. 1 speed |

Sample B

Prepared exactly as Sample A with the single exception that instead of traditional flavors being added to the margarine, and identical amount of flavoring material as used in Sample A is double encapsulated and added to the margarine.

Both Sample A and Sample B are divided into cookie portions and baked in an oven for 8 minutes at 375°F. An expert panel is asked to evaluate the cookies resulting from Samples A and B on the following characteristics: tenderness, crispness, moistness, sweetness, flavor character, flavor impact and flavor aftertaste. Without exception Sample B, the cookies prepared with the margarine containing double encapsulated flavor particles, was rated superior. Statistically Sample B was preferred over Sample A by a margin of 4 to 1.

The conclusion drawn from the results of this experiment are that the double encapsulation of flavors allows an increased flavor carry-through in the final prepared food product in addition to being a superior flavor.

EXAMPLE 4

Two shortening samples are prepared exactly according to the procedure described in Example 1. The single exception is that dextrin is used as the second-layer encapsulating procedure instead of gum arabic. Results identical to those of Example 1 are obtained indicating that the encapsulated flavor shortening with dextrin as the second encapsulation layer is preferred to a non-encapsulated flavor product.

What is claimed is:

1. A double-encapsulated flavor particle comprising:
   a. a volatile flavoring material;
   b. a heat-release, water insoluble material having a melting point of from about 120°F or higher encapsulating said volatile flavoring material; and
   c. an oil-insoluble, water-soluble material encapsulating said heat-release, water-insoluble material.

2. The flavor particle of claim 1 wherein the heat-release, water-insoluble material is a hardstock fat selected from the group consisting of monoglycerides, diglycerides and triglycerides.

3. The flavor particle of claim 1 wherein the heat-release, water-insoluble material has a melting point of from about 130°F to about 150°F.

4. The flavor particle of claim 1 wherein the volatile flavoring material is imitation sweet butter.

5. The flavor particle of claim 1 wherein the water soluble encapsulating material is a gum.

6. The flavor particle of claim 5 wheren the gum is a natural gum.

7. The flavor particle of claim 5 wherein the gum is a starch gum.

8. The flavor particle of claim 5 wherein the gum is gum arabic.

9. The flavor particle of claim 5 wherein the gum is dextrin.

10. The flavor particle of claim 1 wherein the encapsulated flavor particle has a particle size of from about 1 micron to about 300 microns.

11. A food composition comprising a shortening product adapted for increased flavor carry-through, said shortening product having suspended therein the double encapsulated flavor particles of claim 1.

12. The food composition of claim 11 wherein the shortening product is a fluid shortening.

13. The food composition of claim 11 wherein the shortening product is a plastic shortening.

14. The food composition of claim 11 wherein the shortening product is a salad oil.

15. A process for producing a flavored shortening product with an increased retention of flavor during processing and food preparation comprising the steps of:
   a. combining a heat-release, water-insoluble encapsulating agent having a melting point of from about 120°F or higher and a volatile flavoring material under conditions of agitation;

b. spraying the blend resulting from step (a) into a column of chilled air or gas, thus forming single encapsulated particles;

c. separating the encapsulated flavor particles of step (b);

d. placing the encapsulated flavor particles of step (c) in a fluidized bed comprising a vertically mounted cylinder with a porous plate bottom;

e. agitating the encapsulated particles of step (d) with forced air causing a continuous tumbling action;

f. spraying the agitated encapsulated particles of step (e) with a solution of water-soluble, oil-insoluble encapsulating material;

g. adding the dried, double-encapsulated flavor particles of step (f) to a shortening;

h. mechanically agitating the shortening and flavor particles of step (g) until a stable uniform suspension is obtained; and i. packaging the resulting shortening.

16. The process of claim 15 wherein the heat release, water insoluble encapsulating agent of step (a) is a hardstock fat selected from the group consisting of monoglycerides, diglycerides, and triglycerides.

17. The process of claim 15 wherein the forced air of step (e) is heated.

18. The process of claim 16 wherein the fat has a melting point of from about 120°F to about 160°F.

19. The process of claim 16 wherein the fat has a melting point of from about 130°F to about 150°F.

20. The process of claim 16 wherein the liquid flavoring material is imitation sweet butter flavor.

21. The process of claim 15 wherein the shortening of step (g) is a liquid shortening.

22. The process of claim 15 wherein the shortening of step (g) is a plastic shortening.

23. The process of claim 15 wherein the water-soluble, oil-insoluble encapsulating material of step (f) is a gum.

24. The process of claim 23 wherein the gum is a natural gum.

25. The process of claim 23 wherein the gum is a starch gum.

26. The process of claim 23 wherein the gum is gum arabic.

27. The process of claim 23 wherein the gum is dextrin.

28. A process for double encapsulating volatile flavors comprising the steps of:

a. combining a heat-release, water-insoluble encapsulating agent having a melting point of from about 120°F or higher and a volatile flavoring material under conditions of agitation;

b. spraying the blend resulting from step (a) into a column of chilled air or gas, thus forming single encapsulated particles;

c. separating the encapsulated flavor particles of step (b);

d. placing the encapsulated flavor paraticles of step (c) in a fluidized bed comprising a vertically mounted cylinder with a porous plate bottom;

e. agitating the encapsulated particles of step (d) with forced air causing a continuous tumbling action; and f. spraying the agitated encapsulated particles of step (e) with a solution of water-soluble, oil-insoluble encapsulating material thereby providing double encapsulated flavor particles.

29. The process of claim 28 wherein the heat release, water insoluble encapsulating agent of step (a) is a hardstock fat selected from the group consisting of monoglycerides, diglycerides, and triglycerides.

30. The process of claim 29 wherein the fat has a melting point of from about 130°F to about 150°F.

31. The process of claim 29 wherein the liquid flavoring material is imitation sweet butter flavor.

32. The process of claim 28 wherein the forced air of step (e) is heated.

33. The process of claim 28 wherein the water-soluble, oil-insoluble encapsulating material of step (f) is a gum.

34. The process of claim 33 wherein the gum is gum arabic.

* * * * *